United States Patent
Zhang

(10) Patent No.: US 10,410,405 B2
(45) Date of Patent: Sep. 10, 2019

(54) REDUCING COMPUTATIONAL COMPLEXITY IN THREE-DIMENSIONAL MODELING BASED ON TWO-DIMENSIONAL IMAGES

(71) Applicant: Alibaba Group Holding Limited, George Town (KY)

(72) Inventor: Jie Zhang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 15/703,393

(22) Filed: Sep. 13, 2017

(65) Prior Publication Data
US 2018/0012399 A1    Jan. 11, 2018

Related U.S. Application Data

(63) Continuation of application No. PCT/CN2016/075837, filed on Mar. 8, 2016.

(30) Foreign Application Priority Data

Mar. 17, 2015    (CN) .......................... 2015 1 0117117

(51) Int. Cl.
*G06T 15/20* (2011.01)
*G06K 9/46* (2006.01)
(Continued)

(52) U.S. Cl.
CPC .......... *G06T 15/205* (2013.01); *G06K 9/4609* (2013.01); *G06T 7/55* (2017.01); *G06T 17/00* (2013.01)

(58) Field of Classification Search
CPC ......... G06T 17/00; G06T 7/55; G06T 17/205; G06K 9/4609
See application file for complete search history.

(56) References Cited

U.S. PATENT DOCUMENTS

2007/0080967 A1*   4/2007   Miller ................ G06K 9/00208
                                                          345/473
2012/0183238 A1    7/2012   Savvides et al.
(Continued)

FOREIGN PATENT DOCUMENTS

CN        1940996        4/2007
CN        101320485      12/2008
(Continued)

OTHER PUBLICATIONS

CN1940996A (Machine Translation on Jul. 19, 2018) (Year: 2007).*
(Continued)

*Primary Examiner* — Michael Le
(74) *Attorney, Agent, or Firm* — Fish & Richardson P.C.

(57) ABSTRACT

A method for three-dimensional (3D) modeling using two-dimensional (2D) image data includes obtaining a first image of an object oriented in a first direction and a second image of the object oriented in a second direction, determining a plurality of feature points of the object in the first image, and determining a plurality of matching feature points of the object in the second image that correspond to the plurality of feature points of the object in the first image. The method further includes calculating similarity values between the plurality of feature points and the corresponding plurality of matching feature points, calculating depth values of the plurality of feature points, calculating weighted depth values based on the similarity values and depth values, and performing 3D modeling of the object based on the weighted depth values.

20 Claims, 12 Drawing Sheets

(51) Int. Cl.
*G06T 17/00* (2006.01)
*G06T 7/55* (2017.01)

(56) References Cited

U.S. PATENT DOCUMENTS

2013/0100256 A1\* 4/2013 Kirk .................. G06T 7/593
  348/48
2016/0217318 A1\* 7/2016 Hayasaka ............ G06T 3/60

FOREIGN PATENT DOCUMENTS

| CN | 101404091 | 4/2009 | | |
|---|---|---|---|---|
| CN | 101877143 | 11/2010 | | |
| CN | 102054291 | 5/2011 | | |
| CN | 102663820 | 9/2012 | | |
| EP | 1510973 | 8/2004 | | |
| EP | 1510973 A2 \* | 3/2005 | ............ | G06T 17/10 |
| WO | WO 2014186970 | 11/2014 | | |

OTHER PUBLICATIONS

International Search Report of International Searching Authority issued in International Application No. PCT/CN2016/075837 dated Jun. 3, 2016; 11 pages.

Bhowmick B. et al., Mobiscan3D: A low cost framework for real time dense 3D reconstruction on mobile devices. Ubiquitous Intelligence and Computing, 2014 IEEE 11th Intl Conf on and IEEE 11th Intl Conf on and Autonomic and Trusted Computing, and IEEE 14th Intl Conf on Scalable Computing and Communications and its Associated Workshops (UTC-ATC-ScalCom), Dec. 9, 2014, pp. 783-788.

Taskanen P. et al., Live metric 3D reconstruction on mobile phones. 2013 IEEE International Conference on Computer Vision (ICCV), Dec. 1, 2013, pp. 65-72.

Search Report and Examination Report by the Intellectual Property Office of Singapore issued in Singapore Application No. 11201707475W dated Jun. 5, 2018; 6 pages.

Chen, "Research of 3D Face Reconstruction Based on Stereo Vision," Master thesis for professional degree, University of Electronic Science and Technology of China, Jan. 15, 2014, (English Abstract).

Chinese Office Action and Search Report in Chinese Application No. 201510117117.2, dated Jun. 1, 2018, 10 pages (with English translation).

European Extended Search Report in European Application No. 16764182.8, dated Oct. 22, 2018, 10 pages.

Lee, "Depth Weighted Modified Hausdorff Distance for Range Face Recognition," Proceedings of the First Canadian Conference on Computer and Robot Vision, 2014, pp. 252-258.

\* cited by examiner

US 10,410,405 B2

REDUCING COMPUTATIONAL COMPLEXITY IN THREE-DIMENSIONAL MODELING BASED ON TWO-DIMENSIONAL IMAGES

This application is a continuation of PCT Application No. PCT/CN2016/075837 filed on Mar. 8, 2016, which claims priority to Chinese Patent Application No. 201510117117.2, filed on Mar. 17, 2015, the entire contents of each which are hereby incorporated by reference.

TECHNICAL FIELD

This disclosure relates to computer-implemented three-dimensional (3D) modeling using two-dimensional (2D) image data.

BACKGROUND

In some computer-implemented imaging-related applications (for example, computer vision, image enhancement, and object recognition), 2D image data can be used for 3D modeling. For example, information associated with a 2D image, such as light streams, shadows, and texture, can be used to determine a depth of an object, which is an essential characteristic in constructing a 3D model. In some cases, methods that use 2D data, such as light streams, shadows, and texture to calculate depth values for 3D modeling, can have high calculation complexity. In practice, a trade-off exists between accuracy of depth determination and method processing speed. On the one hand, processors with limited processing power, such as those associated with mobile devices, can have difficulty performing real-time 3D modeling using such methods. On the other hand, the accuracy of 3D modeling can be compromised if the data quantity is intentionally reduced to accommodate for processors with limited processing power.

SUMMARY

The present disclosure describes three-dimensional (3D) modeling technology based on two-dimensional (2D) images.

In an implementation, a first image of an object oriented in a first direction and a second image of the object oriented in a second direction are obtained, a plurality of feature points of the object in the first image and a plurality of matching feature points of the object in the second image that correspond to the plurality of feature points of the object in the first image are determined. Similarity values between the plurality of feature points and the corresponding plurality of matching feature points, depth values of the plurality of feature points, and weighted depth values based on the similarity values and depth values are calculated. The 3D modeling of the object is then performed based on the weighted depth values.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations, so as to reduce computational complexity for calculating depth in 3D modeling based on 2D images while maintaining computational accuracy. Other advantages will be apparent to those of ordinary skill in the art.

The details of one or more implementations of the subject matter of this specification are set forth in the Detailed Description, the claims, and the accompanying drawings. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
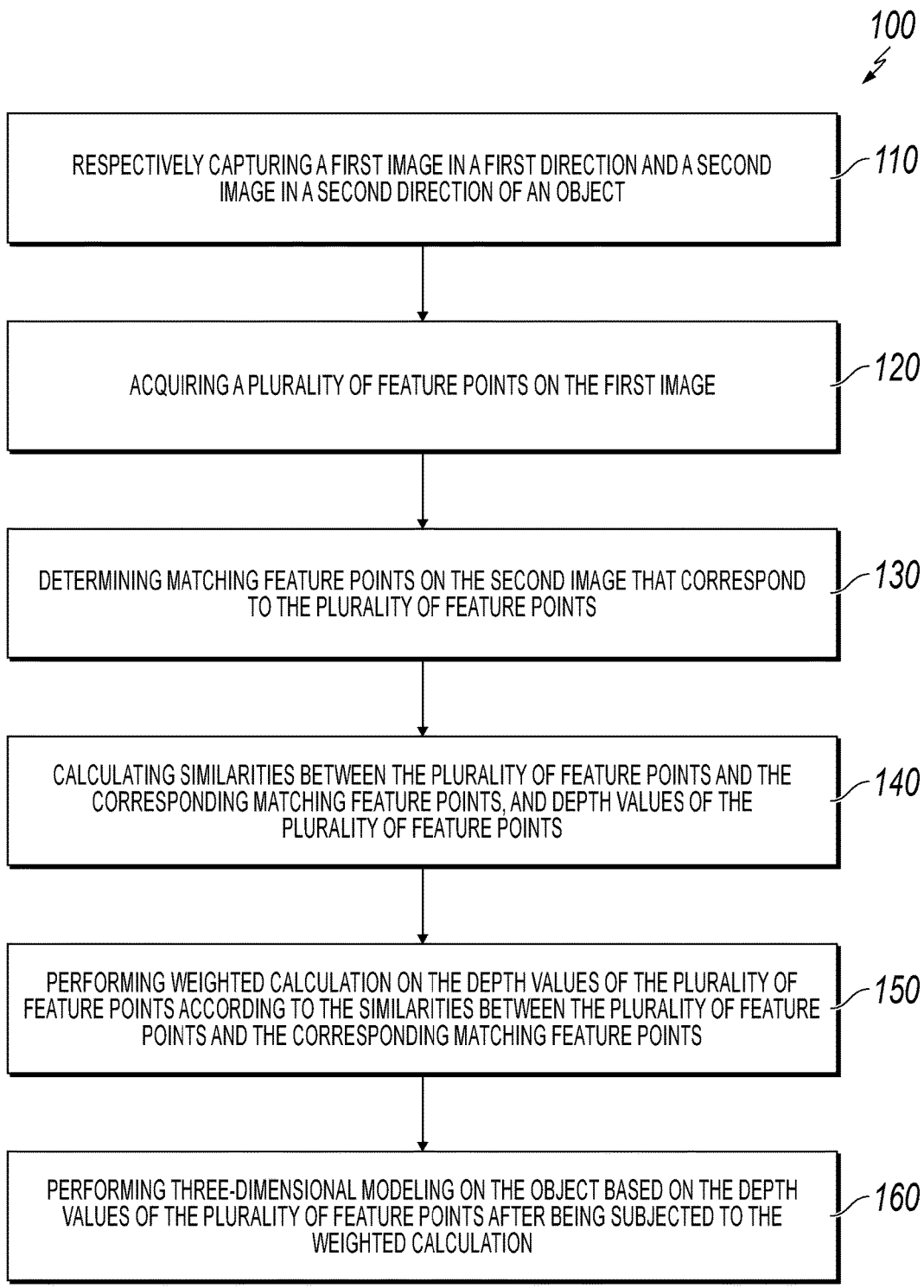
FIG. 1 is a flowchart illustrating an example method of three-dimensional (3D) modeling, according to an implementation of the present disclosure.

The following detailed description describes three-dimensional (3D) modeling of an object based on two-dimensional (2D) images, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from scope of the disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

In some computer-implemented imaging-related applications (for example, computer vision, image enhancement, and object recognition), 2D image data can be used for 3D modeling. For example, information associated with a 2D image, such as light streams, shadows, and texture, can be used to determine a depth of an object, which is an essential characteristic in constructing a 3D model. In some cases, methods that use 2D data, such as light streams, shadows, and texture to calculate depth values for 3D modeling, can have high calculation complexity. In practice, a trade-off exists between accuracy of depth determination and method processing speed. On the one hand, processors with limited processing power, such as those associated with mobile devices, can have difficulty performing real-time 3D modeling using such methods. On the other hand, the accuracy of 3D modeling can be compromised if the data quantity is intentionally reduced to accommodate for processors with limited processing power. The described concepts can be used to reduce computational complexity for 3D modeling while preserving 3D modeling accuracy, particularly for computing devices with limiting processing power.

For example, in some implementations and at a high-level, an example 3D modeling process starts by taking at least two 2D images of an object with respect to two directions. The process then acquires feature points on one of the images, and determines corresponding matching feature points of the object in another direction on another image. The feature points and corresponding matching feature points are used to calculate depths of the feature points. The calculated depth values are then weighted by similarity values evaluated between the feature points and the matching feature points. The process then performs 3D modeling of the object based on the weighted depth values of the feature points. Variations of this example 3D process consistent with this disclosure are considered to be within the scope of this disclosure.

FIG. 1 is a flowchart illustrating an example method 100 of 3D modeling, according to an implementation of the present disclosure. For clarity of presentation, the description that follows generally describes method 100 in the context of the other figures in this description. However, it will be understood that method 100 can be performed, for example, by any suitable system, environment, software, and hardware, or a combination of systems, environments, software, and hardware, as appropriate. In some cases, various steps of method 100 can be run in parallel, in combination, in loops, or in any order.

At 110, the example method 100 captures a first image of an object with respect to a first direction and a second image of the object with respect to a second direction. The object can be any real-world 3D object, such as a human face. The second direction can be different from the first direction by its elevation angle, deflection angle, rotation angle, or any combination thereof. For example, the first image and the second image can be captured from different angles of the object, or they can be captured from the same position but by varying the angle(s) of the object. In some cases, the first image and the second image can be color images that have red, green, and blue (RGB) color channels. In some cases, the pixel resolution of both images are at least 392×440. In some cases, the first image and the second image can be greyscale images that have one color channel.

Figure 5:
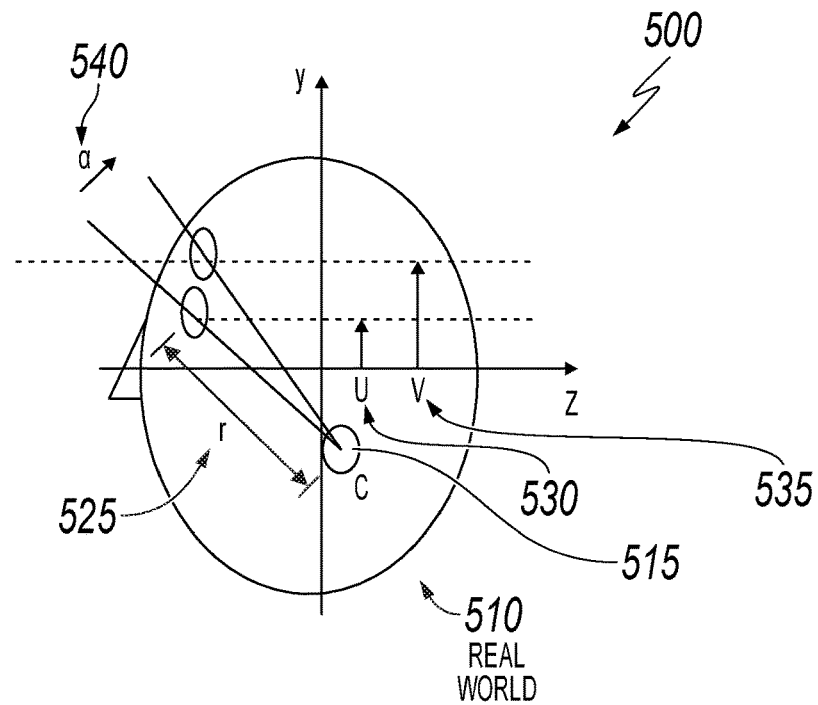
FIG. 5 is a schematic diagram illustrating a general representational example of a real world human face rotating clockwise of an elevation angle $\alpha$ from Y axis to Z axis on a YZ plane, according to an implementation of the present disclosure.
Figure 6:
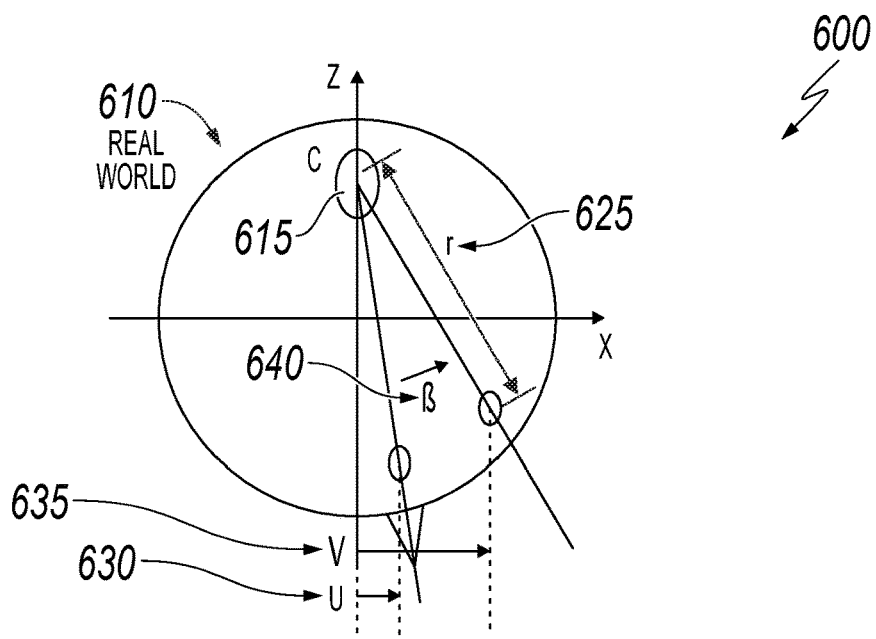
FIG. 6 is a schematic diagram illustrating a general representational example of a real world human face rotating counter-clockwise of a deflection angle $\beta$ from X axis to Z axis on an XZ plane, according to an implementation of the present disclosure.
Figure 7:
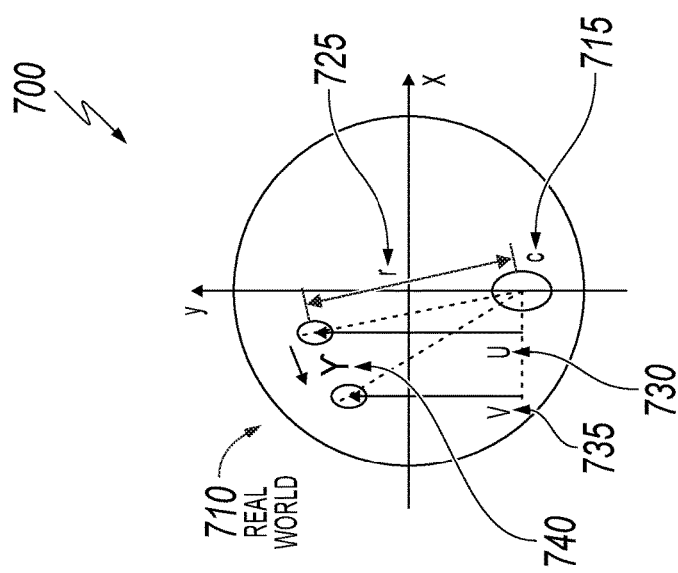
FIG. 7 is a schematic diagram illustrating a general representational example of a real world human face rotating counter-clockwise of a rotation angle $\gamma$ from X axis to Y axis on an XY plane, according to an implementation of the present disclosure.

In some implementations, the difference between the first direction and the second direction in terms of angles is illustrated as in FIGS. 5-7. Referring to FIGS. 5-7, FIGS. 5-7 illustrate an example general representation of a front view of a real world human face (510, 610, and 710, respectively) referenced in coordinate systems. The front view of the human face 510, 610, 710 can be considered as the first image. The X axis can be defined as a horizontal axis with respect to the front view of the human face, the Y axis can be defined as a vertical axis with respect to the front view of the human face, and the Z axis can be defined as and understood to be perpendicular to the X axis and the Y axis and corresponding to a depth measurement of the human face.

FIG. 5 is a schematic diagram illustrating a general representational example 500 of a real world human face rotating clockwise with an elevation angle α 540 from Y axis to Z axis on a YZ plane, according to an implementation of the present disclosure. FIG. 6 is a schematic diagram illustrating a general representational example 600 of a real world human face rotating counter-clockwise of a deflection angle β 640 from X axis to Z axis on an XZ plane, according to an implementation of the present disclosure. FIG. 7 is a schematic diagram illustrating a general representational example 700 of a real world human face rotating counter-clockwise of a rotation angle γ 740 from X axis to Y axis on an XY plane, according to an implementation of the present disclosure. The α, β, and γ angles (540, 640, and 740, respectively) represent differences between the first direction and second direction of the human face. Returning to FIG. 1, from 110, method 100 proceeds 120.

At 120, one or more feature points on the first image are acquired. In some cases, the acquisition of the feature points can be based on edge detection to acquire points from the first image that have significant variations in brightness compared to their surroundings. The use of edge detection processing can reduce an amount of data processed, while preserving structural attributes of the image, such as discontinuities in depth or surface direction, and changes in material property or illumination. One or more implementations of this step is further illustrated in the following description of FIG. 2. In some other cases, corner detection can be used instead of edge detection for feature point acquisition. From 120, method 100 proceeds to 130.

Figure 9A:
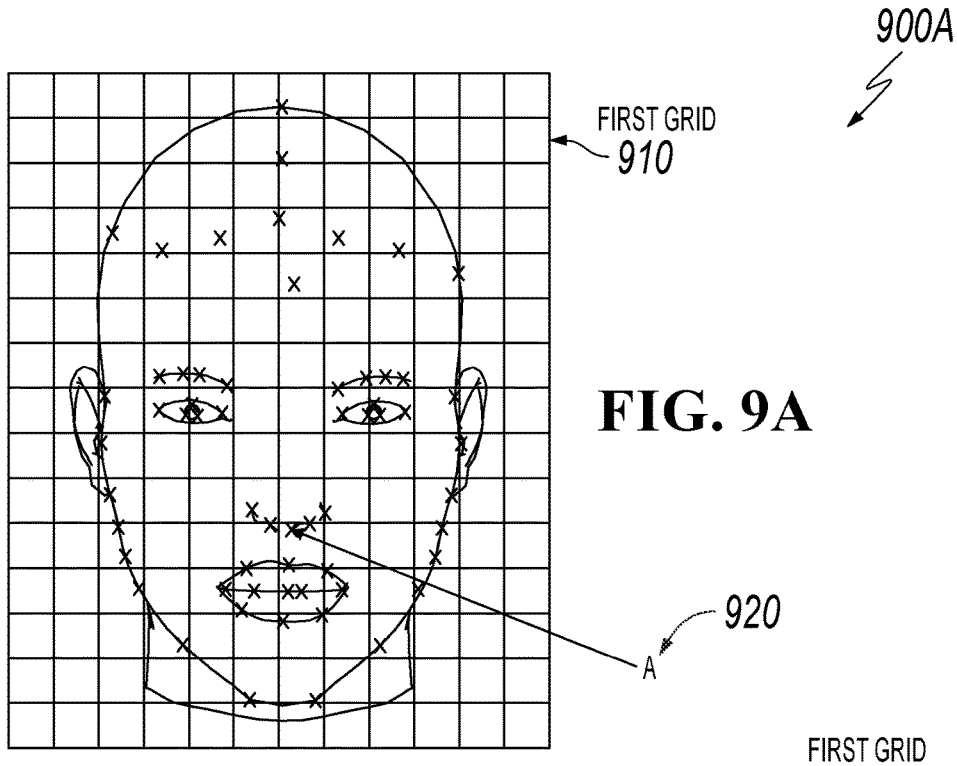
FIGS. 9A and 9B are schematic diagrams illustrating an example of filtering initial feature points using a first grid, according to an implementation of the present disclosure.
Figure 10:
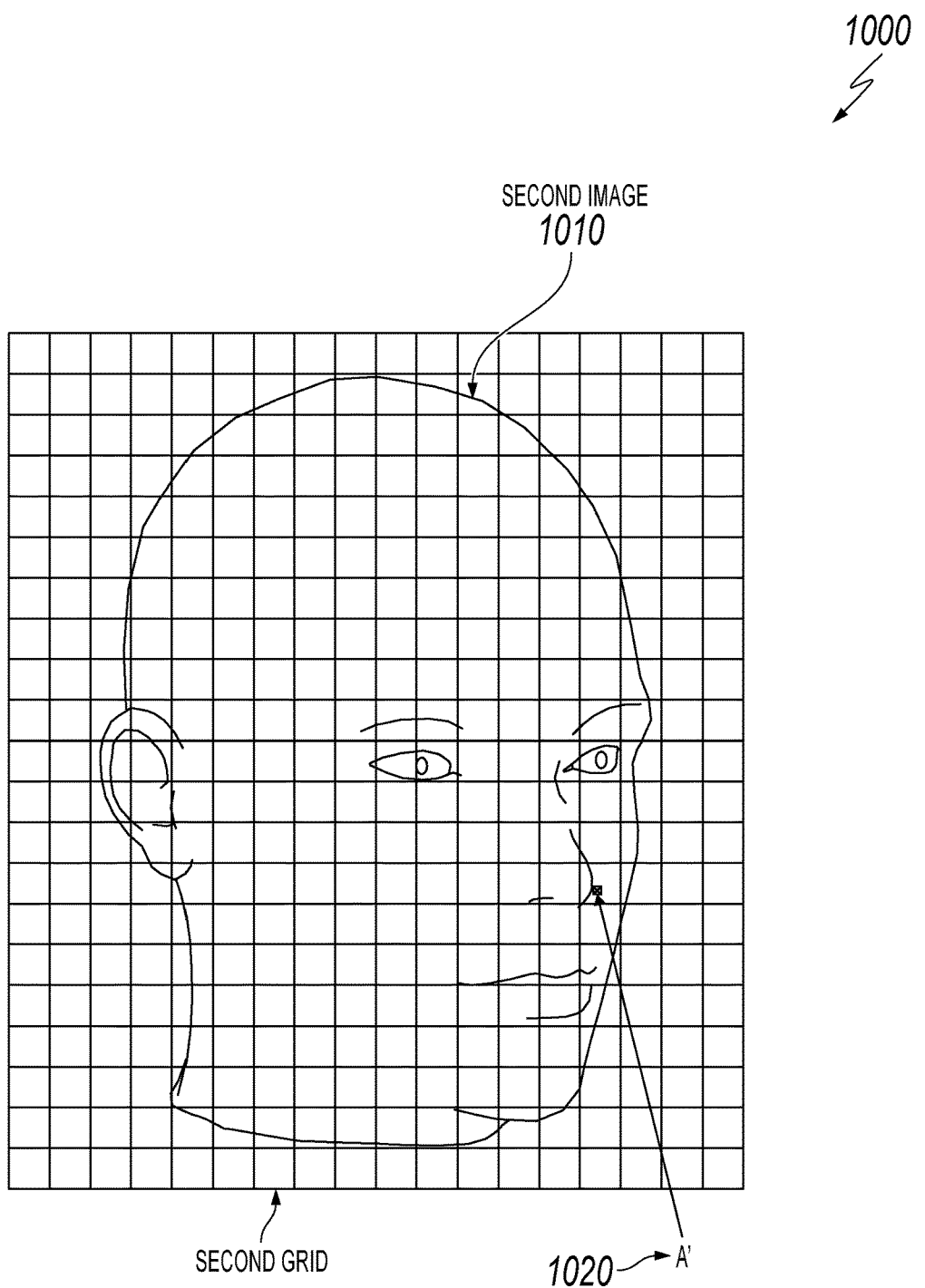
FIG. 10 is a schematic diagram illustrating an example of searching a second image for a matching feature point A' that corresponds to a feature point A on a first image, according to an implementation of the present disclosure.

At 130, matching feature points of the second image that correspond to the feature points acquired from the first image are determined. Referring to FIGS. 9A and 10, FIG. 9A is a schematic diagram 900A illustrating an example of filtering initial feature points using a first grid. Assuming that a feature point A 920 at the tip of the nose as shown on FIG. 9A is acquired from the first image, then the objective of 130 is to search for a matching feature point A' that corresponds to the tip of the nose on the second image. This process can be repeated to determine a plurality of feature points on the second image that matches the feature points acquired on the first image. One or more implementations of this step is further illustrated in the following description of FIG. 3. Returning to FIG. 1, from 130, method 100 proceeds to 140.

At 140, similarities are calculated between the feature points acquired from the first image and the matching feature points on the second image, and depth values of the feature points are calculated. One or more implementations of this step is further illustrated in the description of FIG. 4. Returning to FIG. 1, from 140, method 100 proceeds to 150.

At 150, weighted depth values are calculated based on the depth values and values associated with the similarities between the feature points acquired from the first image and the matching feature points on the second image. In some cases, the weighted depth value can be expressed as, weighted depth value=depth value Z×(sum of average color difference of all feature points except the feature point subject to weighted depth value calculation/sum of the average color value difference of all the feature points). From 150, method 100 proceeds to 160.

At 160, the 3D modeling of the object is performed based on the weighted depth values. In some cases, the 3D modeling can be performed based on a triangular grid, where feature points are selected from the vertices of the triangular grid. In alternative implementations, a polygonal grid/polygonal-type modeling or other types of grids/modeling can be used without departing from the scope of the present disclosure. After 160, method 100 ends.

Figure 2:
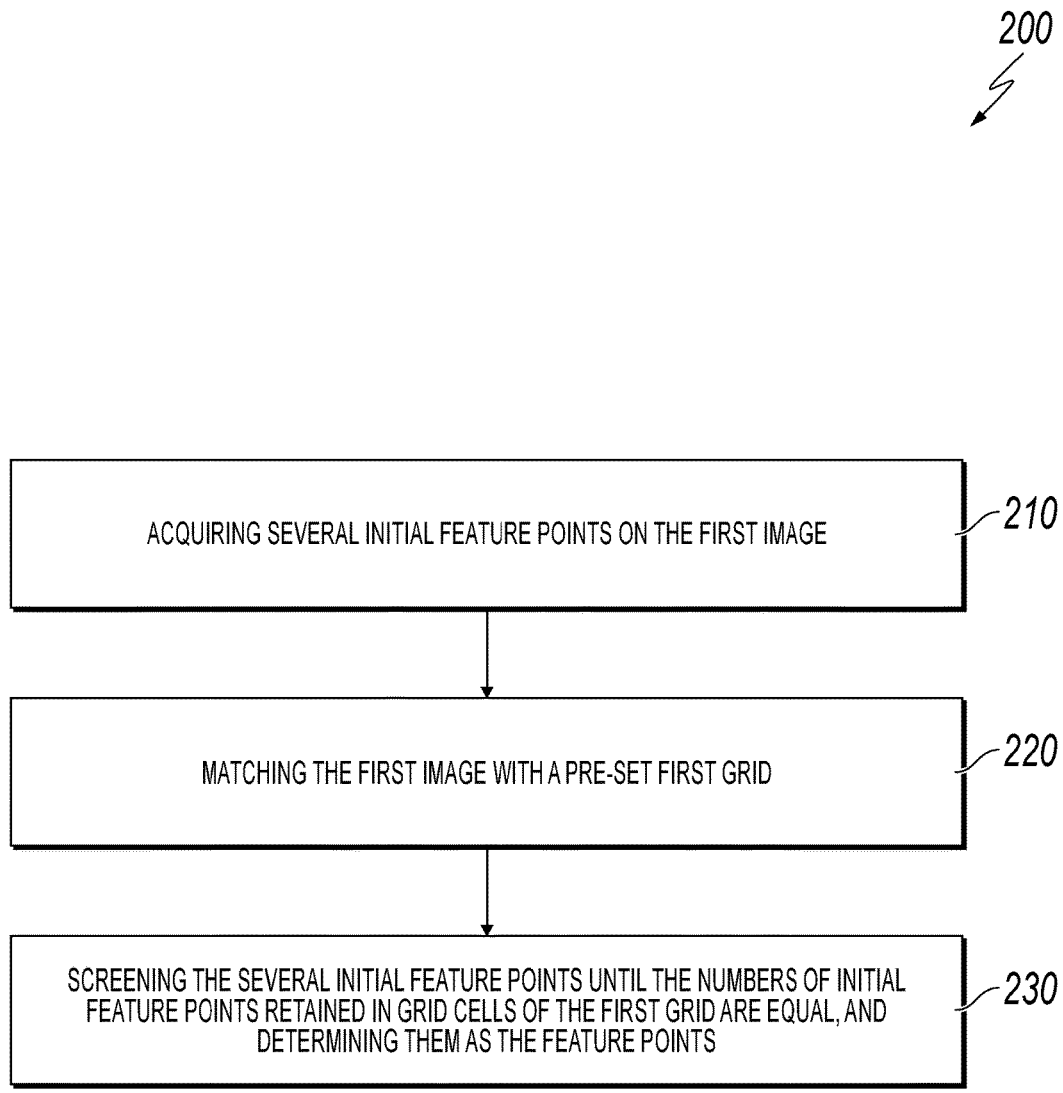
FIG. 2 is a flowchart illustrating an example method of acquiring feature points of an image, according to an implementation of the present disclosure.

FIG. 2 is a flowchart illustrating an example method 200 of acquiring feature points of an image, according to an implementation of the present disclosure. For clarity of presentation, the description that follows generally describes method 200 in the context of the other figures in this description. However, it will be understood that method 200 can be performed, for example, by any suitable system, environment, software, and hardware, or a combination of systems, environments, software, and hardware, as appropriate. In some cases, various steps of method 200 can be run in parallel, in combination, in loops, or in any order.

Figure 8:
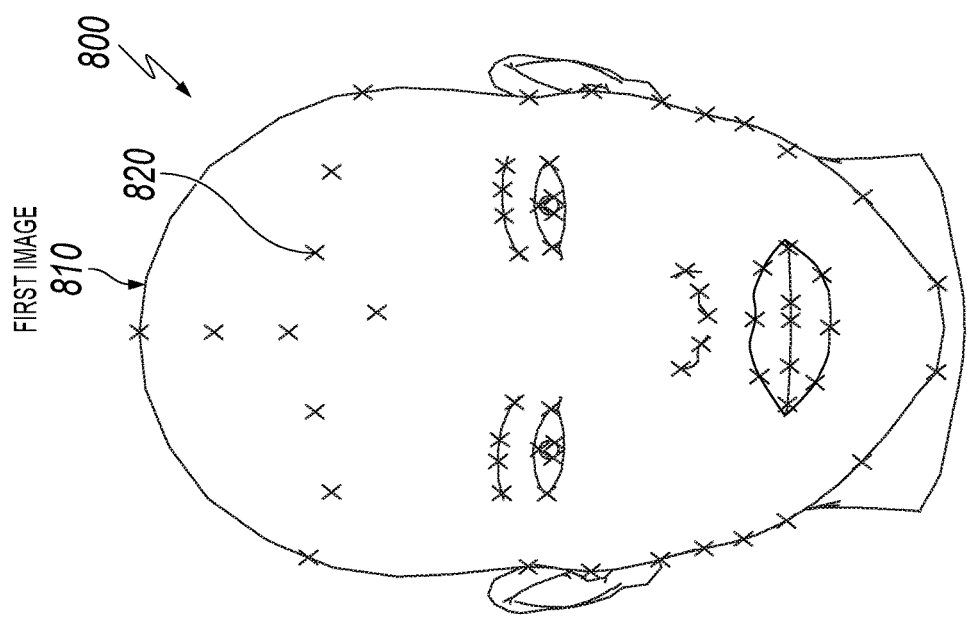
FIG. 8 is a schematic diagram illustrating an example of initial feature points obtained on a first image, according to an implementation of the present disclosure.

At 210, one or more initial feature points are acquired on the image. For example, referring to FIG. 8, FIG. 8 is a schematic diagram 800 of a human face illustrating an example of initial feature points obtained on a first image 810. In the illustration of FIG. 8, the initial feature points (for example, feature point 820) are, in some implementation, based on edge detection processing and indicated by cross marks. The initial feature points can represent prominent features of a human face, including eyes, eyebrows, nose, mouth, cheeks, chin, forehead, or other features. Returning to FIG. 2, from 210, method 200 proceeds to 220.

At 220, the first image is matched with a first grid. For example, referring again to FIG. 9A, a first grid 910 with a square shaped grid cell is matched to an image of a human face (for example, the first image 810 of FIG. 8). It is to be understood that grid cells with other shapes, such as triangular, hexagonal, or other shapes can also be used in alternative implementations. The initial feature points of the first image can fall into different grid cells of the first grid 910. In some cases, the match between the first image and the first grid can be performed by a processor, such as a built-in processor of a cell phone, without any help from a user. Returning to FIG. 2, from 220, method 200 proceeds to 230.

At 230, initial feature points are filtered to a smaller amount of feature points. Referring again to FIG. 9A, the number of initial feature points in different grid cells cannot be uniformly distributed. Some grid cells can include more feature points than others. In some cases, certain grid cells can contain a large number of initial feature points that calculating depth for every initial feature point can be burdensome or unnecessary, especially for mobile devices with limited processing power. Strategically filtering the initial feature points to a smaller amount of feature points can still preserve the features of the human feature while reducing the computational complexity.

Figure 9B:
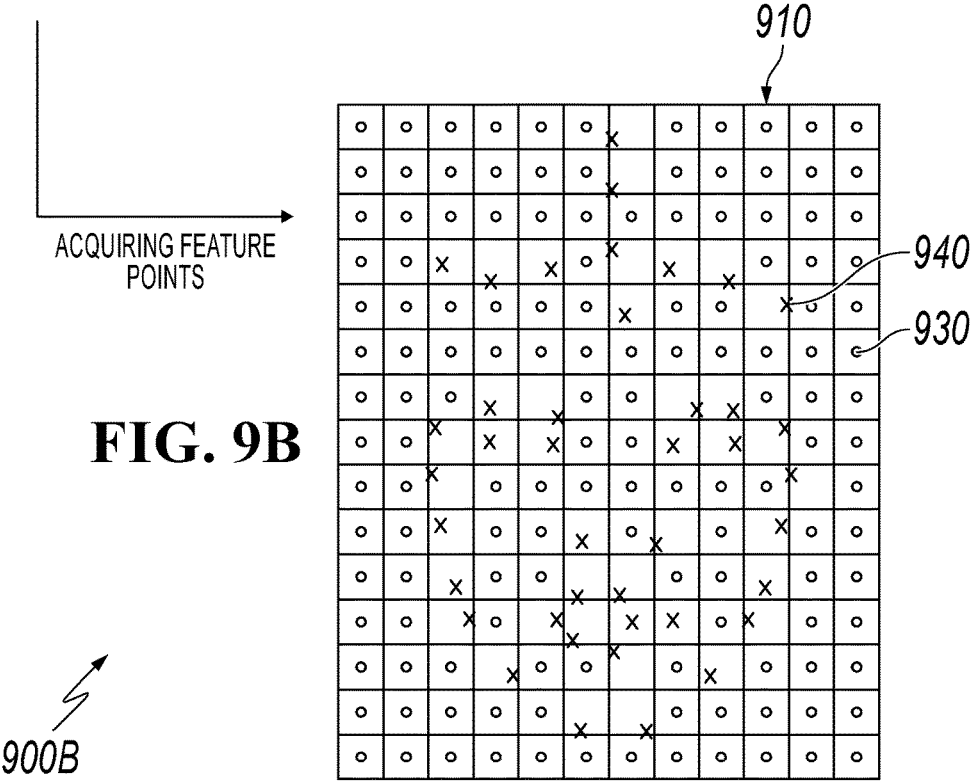

In some cases, the filtering of the initial feature points can reduce the number of initial feature points to a same amount of feature points in each feature point-containing grid cell. For example, referring to FIG. 9B, FIG. 9B is a schematic diagram 900B illustrating an example of filtering initial feature points using the first grid 910 of FIG. 9A. The process of filtering the initial feature points can be described as follows. First, for each feature point-containing grid cell, determine the distances between the initial feature points and the center of the cell. Second, select the initial feature point closest to the center of the grid cell as the filtered feature point 940. Third, for the grid cells that do not contain any initial feature point, mark the center of those cells as their filtered feature points 930 (shown as hollow circles in FIG. 9B).

In some cases, average coordinate values of the initial feature points of each grid cell can be calculated. The filtered feature points can be set as points determined by the calculated average of the coordinate values.

In some other implementations, instead of reducing the number of initial feature points to the same amount of feature points, the difference in numbers of feature points in different feature point-containing grid cells can be maintained under a pre-determined threshold after filtering. For example, after filtering, the maximum number of feature points contained in a grid cell can be no larger than two of the minimum number of feature points contained in a grid cell. Returning to FIG. 2, after 230, method 200 ends.

Figure 3:
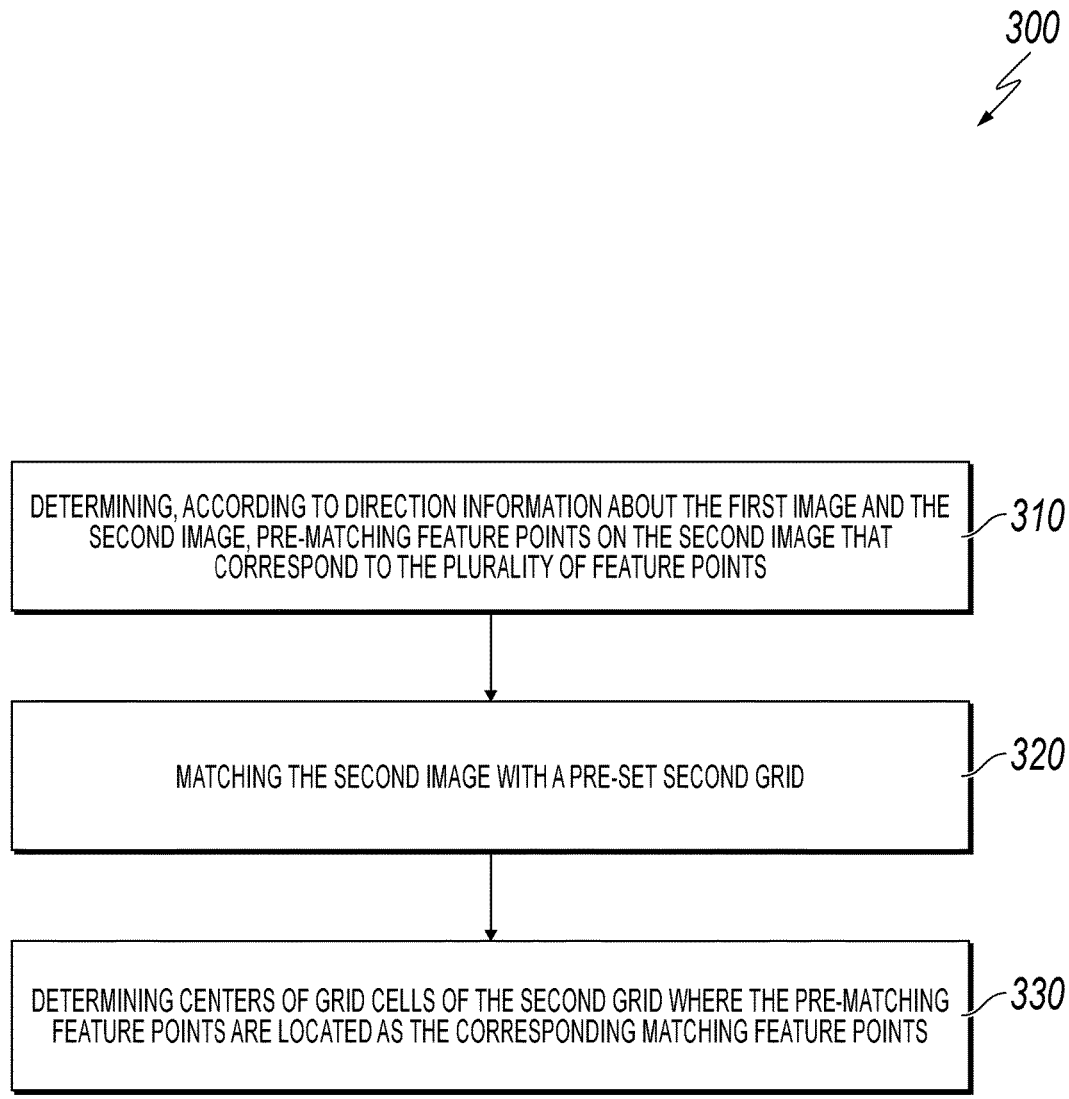
FIG. 3 is a flowchart illustrating an example method of determining matching feature points of a second image that correspond to feature points of a first image, according to an implementation of the present disclosure.

FIG. 3 is a flowchart illustrating an example method 300 of determining matching feature points of a second image that correspond to feature points of a first image, according to an implementation of the present disclosure. For clarity of presentation, the description that follows generally describes method 300 in the context of the other figures in this description. However, it will be understood that method 300 can be performed, for example, by any suitable system, environment, software, and hardware, or a combination of systems, environments, software, and hardware, as appropriate. In some cases, various steps of method 300 can be run in parallel, in combination, in loops, or in any order.

At 310, the example method 300 determines pre-matching feature points on the second image that correspond to the feature points of the first image based on direction information of the object in the first image and the second image. The directional information associated with the first image and the second image can be determined by a variety of methods. For example, in some implementations, a mobile device with a built-in camera can be used to capture the first image and the second image of an object. The directional information associated with the first image and the second image can be determined based on motion data sensed by mobile device sensors, such as a gyroscope, accelerometer, digital compass, GPS, magnetometer, light detector, cellular/WIFI/Bluetooth, or other sensors.

In some cases, the directional information associated with the first image and the second image can be determined based on a posture measurement algorithm. For example, referring again to FIGS. 5-7, assume that a first image of a human head oriented at a first direction and a second image of the human head oriented at a second direction are captured. Let C (515, 615, and 715, respectively) represent the rotation center of the human head and r (525, 625, and 725, respectively) represent the distance between the center of two eyes and the rotation center, coordinate values Cx, Cy, and Cz, of the rotation center C 515, 615, and 715 can be estimated based on knowledge of human anatomy. Similarly, (Ux, Uy) are the coordinates of U that represent the center point of the two eyes on the first image (530, 630, and 730, respectively) and (Vx, Vy) are the coordinate of V that that represent the center point of the two eyes on the second image (535, 635, and 735, respectively).

The depth Ez of the center of the two eyes when the human head is front facing can be estimated. The elevation angle α 540, deflection angle β 640, and rotation angle γ 740 can then be calculated as:

$$\alpha = sin^{-1}\left(\frac{V_Y - C_Y}{r}\right) - sin^{-1}\left(\frac{U_Y - C_Y}{r}\right),$$

where $$r = \sqrt{(U_Y - C_Y)^2 + (E_Z - C_Z)^2}\ ;$$

$$\beta = sin^{-1}\left(\frac{V_X - C_X}{r}\right) - sin^{-1}\left(\frac{U_X - C_X}{r}\right),$$

where $$r = \sqrt{(U_X - C_X)^2 + (E_Z - C_Z)^2}\ ;$$

and $$\gamma = tan^{-1}\left(\frac{V_Y}{-V_X}\right) - tan^{-1}\left(\frac{U_Y}{-U_X}\right).$$

From 310, method 300 proceeds to 320.

At 320, the example method 300 matches the second image with a pre-determined second grid. For example, referring to FIG. 10, FIG. 10 is a schematic diagram 1000 illustrating an example of searching a second image 1010 for a matching feature point A' 1020 that corresponds to the feature point A 920 on a first image 910. Squares in the schematic diagram 1000 are used as the shape of the grid cells of the second grid in this particular implementation. The area of the cells of the second grid can be smaller than the area of the cells of the first grid. This means that the second grid would include more cells than the first grid for the same overall grid area. The additional cell can be used to increase the accuracy of the matching feature point's calculation. From 320, method 300 proceeds to 330.

At 330, the example method 300 sets the center points of grid cells of the second grid that contain pre-matching feature points as the matching feature points. After 330, method 300 stops.

Figure 4:
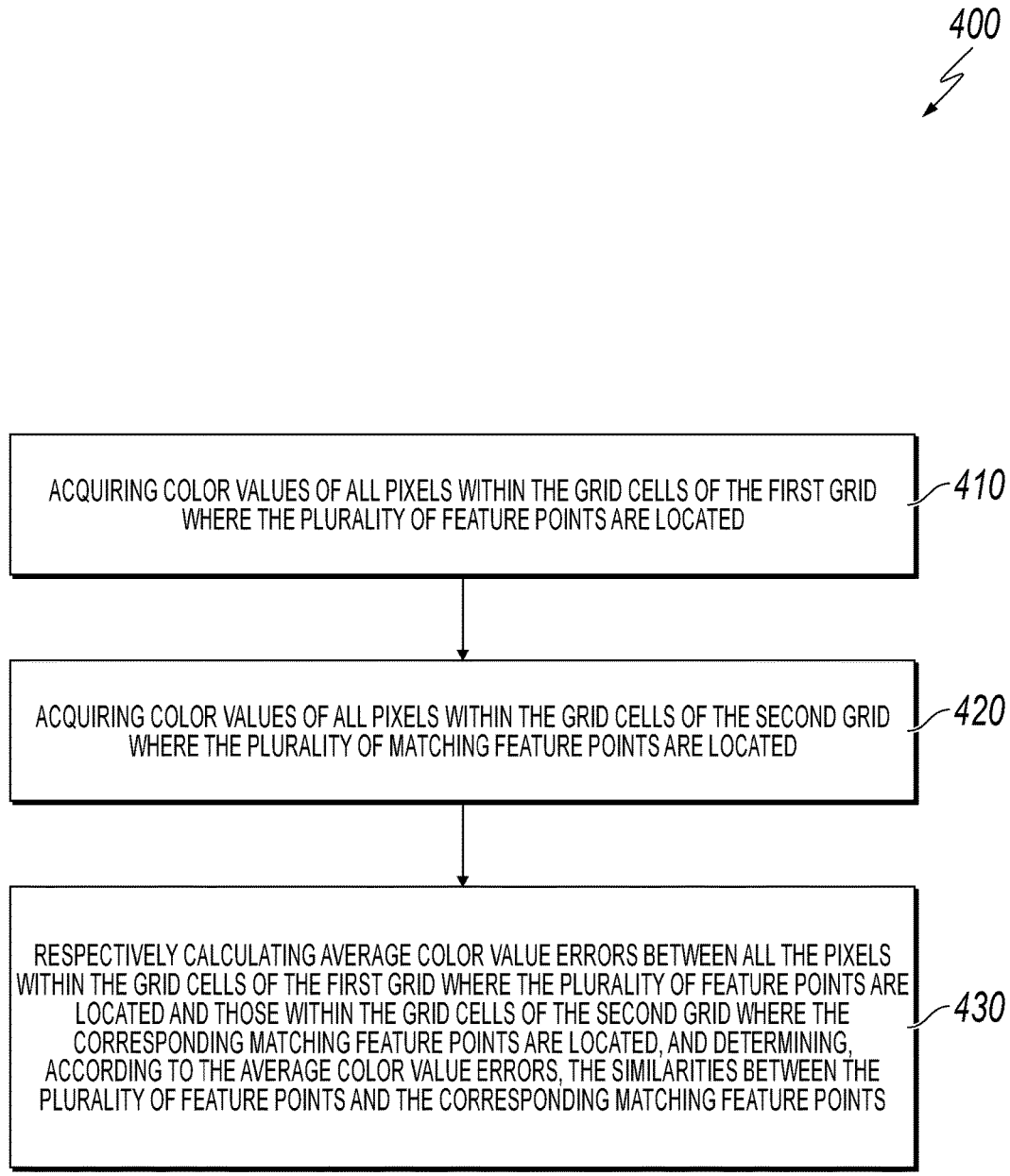
FIG. 4 is a flowchart illustrating an example method of calculating similarities between feature points from two two-dimensional (2D) images, according to an implementation of the present disclosure.

FIG. 4 is a flowchart illustrating an example method 400 of calculating similarities between feature points from two 2D images and matching the feature points, according to an implementation of the present disclosure. For clarity of presentation, the description that follows generally describes method 400 in the context of the other figures in this description. However, it will be understood that method 400 can be performed, for example, by any suitable system, environment, software, and hardware, or a combination of systems, environments, software, and hardware, as appropriate. In some cases, various steps of method 400 can be run in parallel, in combination, in loops, or in any order.

At 410, the example method 400 acquires color values of all pixels in the grid cells of the first grid that contain at least one feature point. In some cases, the color values can be the particular R, G, and B color channel values associated with the pixels. From 410, method 400 proceeds to 420.

At 420, the example method 400 acquires color values of all pixels in the grid cells of the second grid that contain at least one feature point. From 420, method 400 proceeds to 430.

At 430, the example method 400 calculates average color value difference between the pixels in a grid cell of the first grid that contains at least one feature point and the pixels in a grid cell of the second grid that contains at least one matching feature point. The average color value difference can indicate the similarities between the at least one feature point of the grid cell of the first grid and the at least one feature point of the grid cell of the second grid. In some implementations, the calculation of the average color value difference S can be expressed as:

$$S = \lambda \sum_i \sum_j \frac{R(F_{ij}, S_{ij}) + G(F_{ij}, S_{ij}) + B(F_{ij}, S_{ij})}{3\|F\|},$$

where i and j are coordinate values of a pixel within its corresponding grid cell of the first grid, $F_{ij}$ is a feature point with pixel coordinates (i, j), $S_{ij}$ is a matching feature point with pixel coordinates (i, j), $R(F_{ij}, S_{ij})$ is an absolute value of the difference between points $F_{ij}$ and $S_{ij}$ on the R channel, $G(F_{ij}, S_{ij})$ is an absolute value of the difference between points $F_{ij}$ and $S_{ij}$ on the G channel, $B(F_{ij}, S_{ij})$ is an absolute value of the difference between points $F_{ij}$ and $S_{ij}$ on the B channel, $\|F\|$ is the area of the grid cells of the first grid (that is, the number of pixels contained within the grid cell of the first grid), and λ is a constant, which can be calculated, in some implementations, as:

$$\lambda = \left(1 + \frac{|sp.x - fp.x|}{maxX} + \frac{|sp.y - fp.y|}{maxY}\right),$$

where max X and max Y are the farthest distance values (unit in pixels) away from the corresponding feature points within one grid cell of the first grid; and fp.x and fp.y are coordinate values of the feature points, and sp.x and sp.y are coordinate values of the matching feature points.

The similarity between the feature points and the matching feature points can be determined based on the calculated average color value difference of the corresponding grid cell pixels. The greater the difference, the lower the similarity between the feature points and matching feature points.

In some cases, the feature points can be filtered based on a similarity between the feature points and the matching feature points. For example, a feature point eliminating threshold can be determined based on the similarity between a plurality of feature points and a corresponding plurality of matching feature points, such as the similarity S calculated based on the previously shown equation. Individual feature point and its matching feature point can be filtered out if the similarity between them is less than the feature point eliminating threshold. When the similarity between a feature point and its matching feature point is less than the eliminating threshold, it can be inferred that the matching feature point is not be the corresponding point on the second image to the feature point on the first image. Accordingly, it can be determined that the matching of the feature point has failed and the failed feature points are not to be included in subsequent 3D modeling calculation.

Referring again to FIGS. 5-7, in some implementations, the depth of a feature point can be obtained by combining depths of matching feature points at an elevation angle $Z_\alpha$, a deflection angle $Z_\beta$, and a rotation angle $Z_\gamma$ (for example, elevation angle α 540, deflection angle β 640, and rotation angle γ 740 in FIGS. 5-7). Using the depths of the matching feature points at different angles can improve the accuracy of the depth calculation. In some implementations, the depth of a feature point at the elevation angle can be calculated as:

$$Z_\alpha = C_Z - \frac{(V_Y - C_Y) - (U_Y - C_Y)\cos\alpha}{\sin\alpha},$$

the depth of a feature point at the deflection angle can be calculated as:

$$Z_\beta = C_Z - \frac{(V_X - C_X) - (U_X - C_X)\cos\beta}{\sin\beta},$$

and the depth of a feature point at a rotation angle can be calculated as:

$$Z_\gamma = U_Y \cos\gamma - U_x \sin\gamma.$$

where $(U_X, U_Y)$ are the coordinates of the feature point on the first image and $(V_X, V_Y)$ are the coordinates of the matching feature point on the second image. In some implementations, the depth of the feature point, Z, can then be calculated based on $Z_\alpha$, $Z_\beta$ and $Z_\gamma$, that can be expressed as:

$$Z = Z_\alpha \frac{\sin\alpha}{\sin\alpha + \sin\beta + \sin\gamma} + Z_\beta \frac{\sin\beta}{\sin\alpha + \sin\beta + \sin\gamma} + Z_\gamma \frac{\sin\gamma}{\sin\alpha + \sin\beta + \sin\gamma}.$$

The depth value Z can be used to calculate a weighted depth value as discussed in the description of 150 of FIG. 1. The weighted depth value can be used to perform 3D modeling of the object. After 430, method 400 stops.

Figure 11:
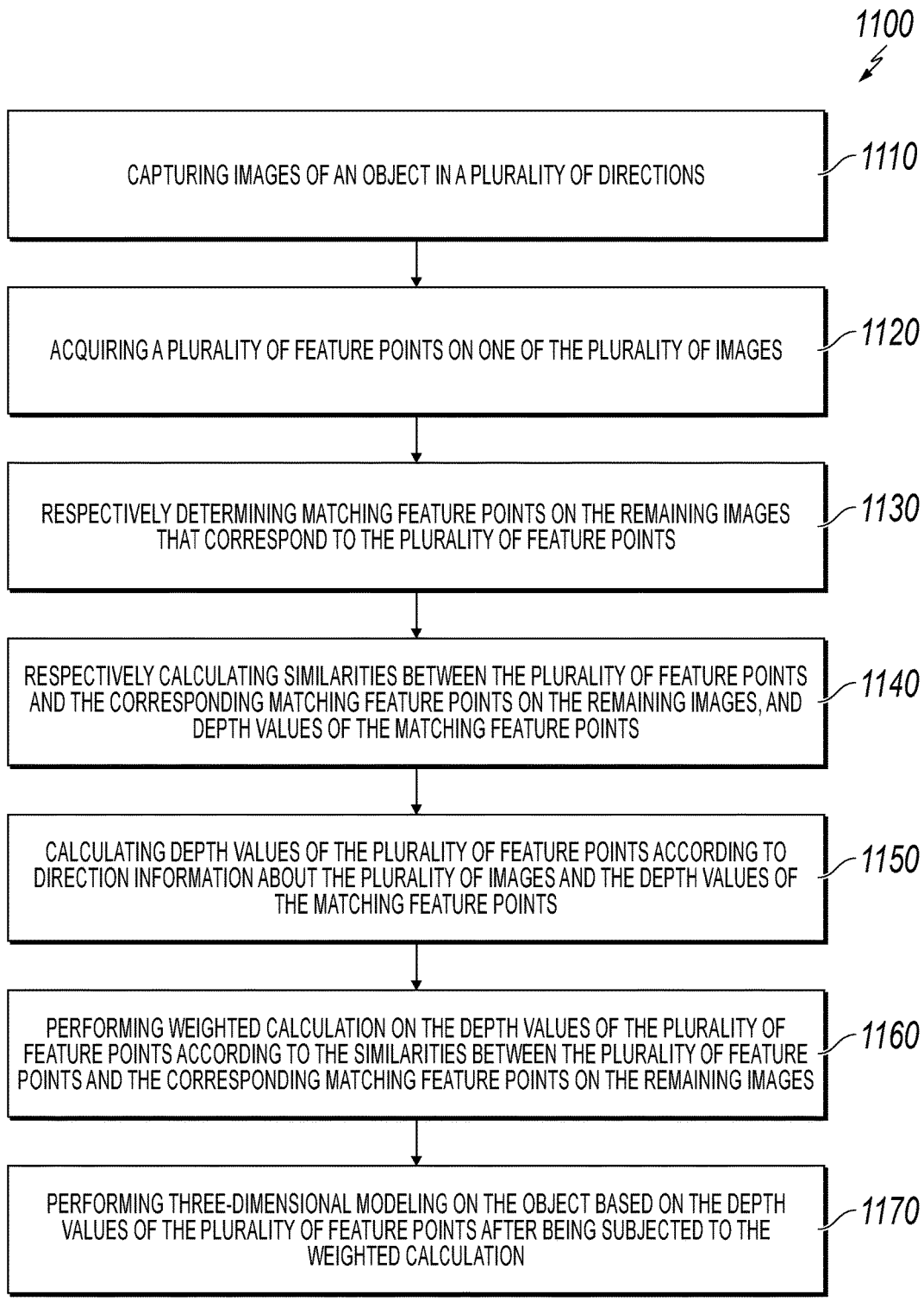
FIG. 11 is a flowchart illustrating another example method of 3D modeling, according to an implementation of the present disclosure.

FIG. 11 is a flowchart illustrating another example method 1100 of 3D modeling, according to an implementation of the present disclosure. For clarity of presentation, the description that follows generally describes method 1100 in the context of the other figures in this description. However, it will be understood that method 1100 can be performed, for example, by any suitable system, environment, software, and hardware, or a combination of systems, environments, software, and hardware, as appropriate. In some cases, various steps of method 1100 can be run in parallel, in combination, in loops, or in any order.

At 1110, the example method 1100 captures images of an object in a plurality of directions. From 1110, method 1100 proceeds to 1120.

At 1120, the example method 1100 acquires a plurality of feature points on a first of the plurality of images. From 1120, method 1100 proceeds to 1130.

At 1130, the example method 1100 determines matching feature points on the other images that correspond to the plurality of feature points on the first image. From 1130, method 1100 proceeds to 1140.

At 1140, the example method 1100 calculates similarities between the plurality of feature points on the first image and the corresponding matching feature points on the other images, and calculates depth of the matching feature points. From 1140, method 1100 proceeds to 1150.

At 1150, the example method 1100 calculates depths of the plurality of feature points according to direction information about the plurality of images and the depths of the matching feature points. From 1150, method 1100 proceeds to 1160.

At 1160, the example method 1100 performs weighted calculation on the depths of the plurality of feature points according to the similarities between the plurality of feature points and the corresponding matching feature points. From 1160, method 1100 proceeds to 1170.

At 1170, the example method performs 3D modeling on the object based on the weighted depths of the plurality of feature points. After 1170, method 1100 stops.

Figure 12:
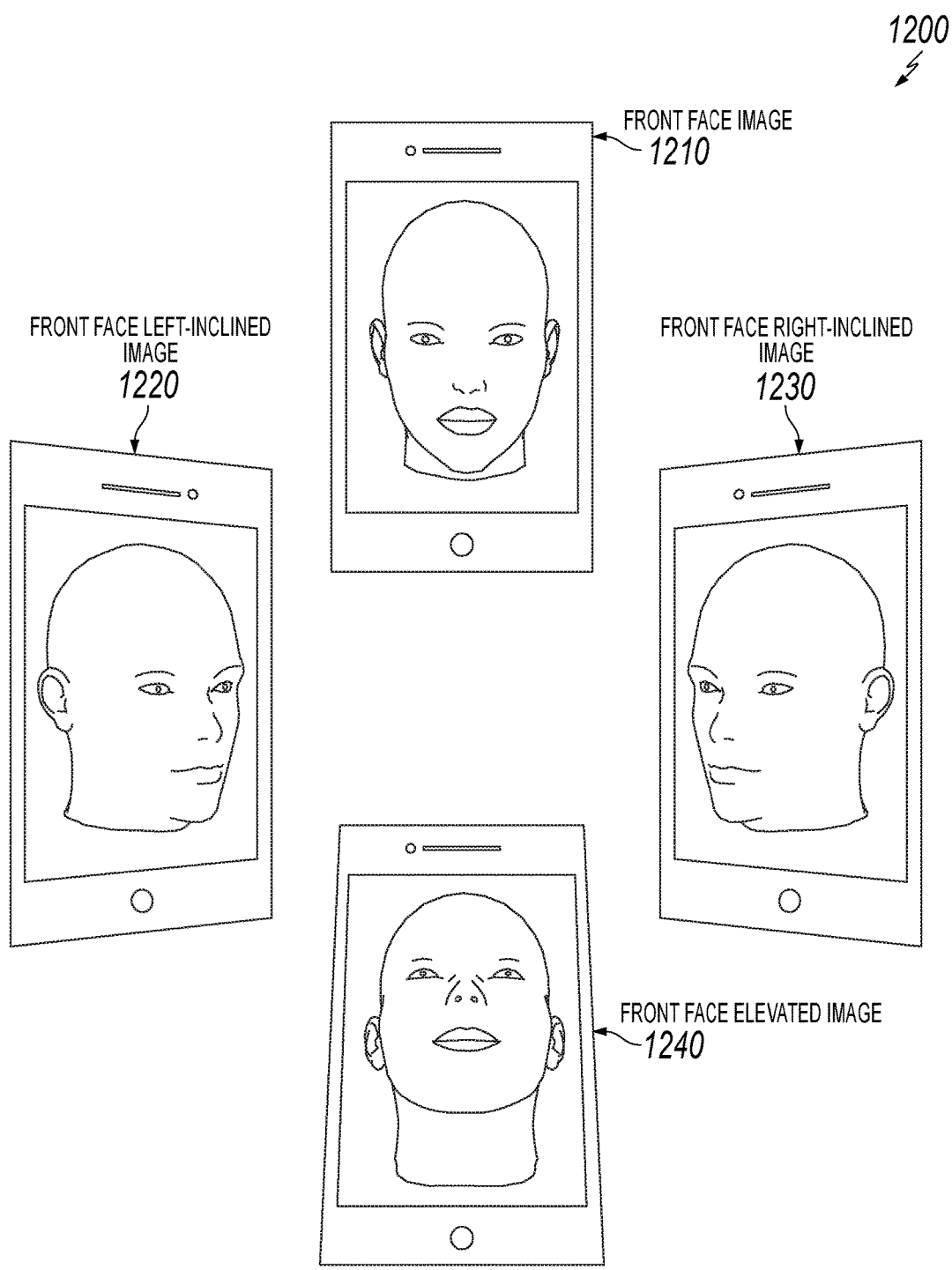
FIG. 12 is a schematic diagram illustrating examples of a front face image, a front face elevated image, a front face left-turned image, and a front face right-turned image of a human face captured by a mobile device, according to an implementation of the present disclosure.

FIG. 12 is a schematic diagram illustrating examples 1200 of a front face image 1210, a front face elevated image 1240, a front face left-inclined image 1220, and a front face right-inclined image 1230 of a human face captured by a mobile device, according to an implementation of the present disclosure. The first direction of the object in the front face image 1210 can be considered the reference direction. The three directions of the object in the second, third, and fourth images (1240, 1220, and 1230, respectively) can be different in elevation, deflection, or rotation angles from the reference direction when captured. Matching feature points that correspond to the feature points acquired on the front face image 1210 can be substantially identified on the front face elevated image 1240, the front face left-inclined image 1220, or the front face right-inclined image 1230. As such, the depth calculation can take advantage of the depths at different angles as previously discussed to improve accuracy.

In the illustrated examples 1200, four images with four directions of the object are used for 3D modeling. It is to be understood that in other implementations, a different number of images can be used depending on the processing power of the 3D modeling device and accuracy requirement.

Figure 13:
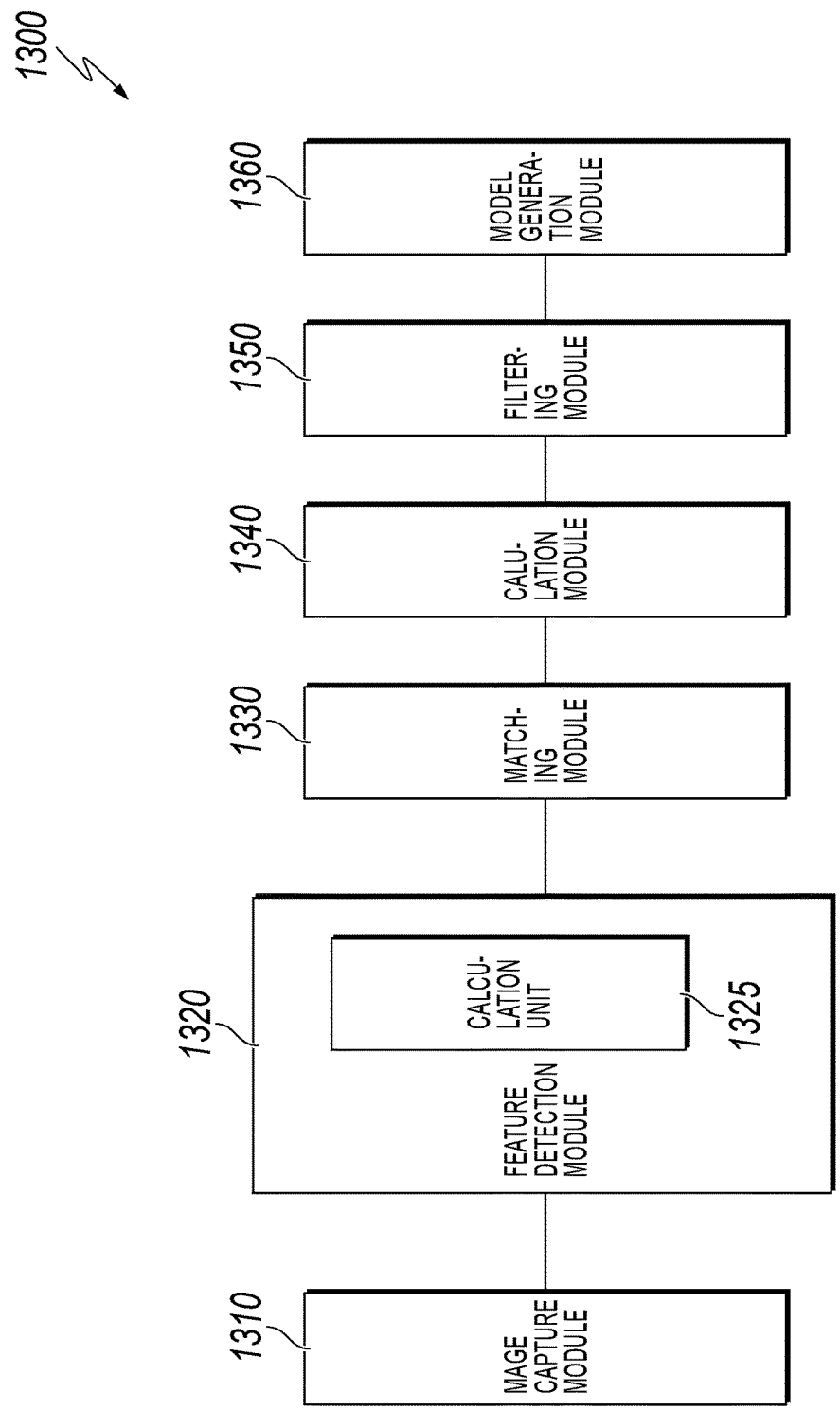
FIG. 13 is a schematic diagram illustrating example modules of a 3D modeling device, according to an implementation of the present disclosure.

FIG. 13 is a schematic diagram illustrating example modules 1300 of a 3D modeling device, according to an implementation of the present disclosure. The example modules 1300 can include an image capturing module 1310, a feature point detection module 1320, a calculation module 1325, a matching module 1330, a calculation module 1340, a filtering module 1350, and a model generation module 1360.

In some cases, the image capture module 1310 can capture at least a first image of an object in a first direction and a second image of the object in a second direction. The feature point detection module 1320 can acquire initial feature points on the first image, match the first image with a pre-set first grid, and filtering the initial feature points such that the number of initial feature points is the same in each grid cell of the first grid, as discussed in the description of 230 of FIG. 2. In some cases, the 3D modeling can be performed based on a triangular grid, where feature points are selected from the vertices of the triangular grid. In alternative implementations, a polygonal grid/polygonal modeling or other grid/modeling shape can be used without departing from the scope of the present disclosure.

In some cases, the feature detection module 1320 can include a calculation unit 1325. The calculation unit 1325 can calculate distances from the initial feature points to center points of their respective grid cells of the first grid. The feature detection module 1320 can also determine the closest initial feature point to the center of the corresponding grid cell as the feature point. The feature detection module 1320 can further determine the center of the grid cell as a feature point if the cell does not contain any initial feature points as discussed in the description of 230 of FIG. 2.

The matching module 1330 can determine matching feature points on the second image that correspond to the feature points on the first image. The matching module 1330 can determine, according to direction information of the first image and the second image, pre-matching feature points on the second image that correspond to the feature points on the first image, match the second image with a pre-set second grid, and determine the center points of grid cells of the second grid where the pre-matching feature points are located as the corresponding matching feature points, as discussed in the description of FIG. 3.

The calculation module 1340 can calculate similarities between the feature points and the corresponding matching feature points, calculate depths of the plurality of feature points, and perform a weighted calculation of the depths of the feature points based on the similarities between the feature points and the corresponding matching feature points. The calculation module 1340 can acquire color values of all pixels in the grid cells of the first grid that contain at least one feature point, color values of all pixels in the grid cells of the second grid that contain at least one feature point, and calculate average color value difference between the pixels in a grid cell of the first grid that contains at least one feature point and the pixels in a grid cell of the second grid that contains at least one matching feature point. The similarities between the feature points and the matching feature points can be determined based on the calculated average color value difference of the corresponding grid cell pixels, as discussed in the description of FIG. 4.

The calculation module 1340 can also calculate weighted depth values based on the depth values and values associated with the similarities between the feature points acquired from the first image and the matching feature points on the second image. In some cases, the weighted depth value can be expressed as: weighted depth value=depth value $Z\times$(sum of the average color value errors of all the feature points except the feature points to be subjected to the weighted calculation/sum of the average color value errors of all the feature points), as discussed in the description of 150 of FIG. 1.

In some cases, the area of the cells of the second grid can be smaller than the area of the cells of the first grid. This means that the second grid would include more cells than the first grid for the same overall grid area. The additional cell can be used to increase the accuracy of the matching feature point's calculation.

The filtering module 1350 can filter the feature points based on the similarities between the feature points and the corresponding matching feature points prior to performing the weighted calculation of the depths of the feature points. In some cases, the filtering module 1350 can determine a feature point eliminating threshold based on the similarities between the feature points and the corresponding matching feature points. Individual feature point and its matching feature point can be filtered out if the similarity between them is less than the feature point eliminating threshold, as discussed in the description of 430 of FIG. 4.

The model generation module 1360 can perform 3D modeling on the object based on the depths of the feature points after being subjected to the weighted calculation.

In some cases, the image capture module 1310 can capture a plurality of images of an object in more than two directions. For example, as discussed in the description of FIG. 12, the image capture module 1310 can capture four images of a human face, including a front face image, a front face elevated image, a front face left-turned image, and a front face right-turned image of a human face captured by a mobile device. The first direction of the object in the first image can be considered the reference direction. The three directions of the object in the second, third, and fourth images can be different in elevation, deflection, or rotation angles from the reference direction when captured.

The feature detection module 1320 can acquire a plurality of feature points on one of the plurality of images. The matching module 1330 can determine matching feature points on the remaining images that correspond to the plurality of feature points. The calculation module 1340 can calculate the similarities between the plurality of feature points on the first image and the corresponding matching feature points on the other images, and calculates depth of the matching feature points, the depths of the plurality of feature points according to direction information about the plurality of images and the depths of the matching feature points, and perform weighted calculation on the depths of the plurality of feature points according to the similarities between the plurality of feature points and the corresponding matching feature points. The model generating module 1360 can perform 3D modeling on the object based on the weighted depths of the plurality of feature points.

Figure 14:
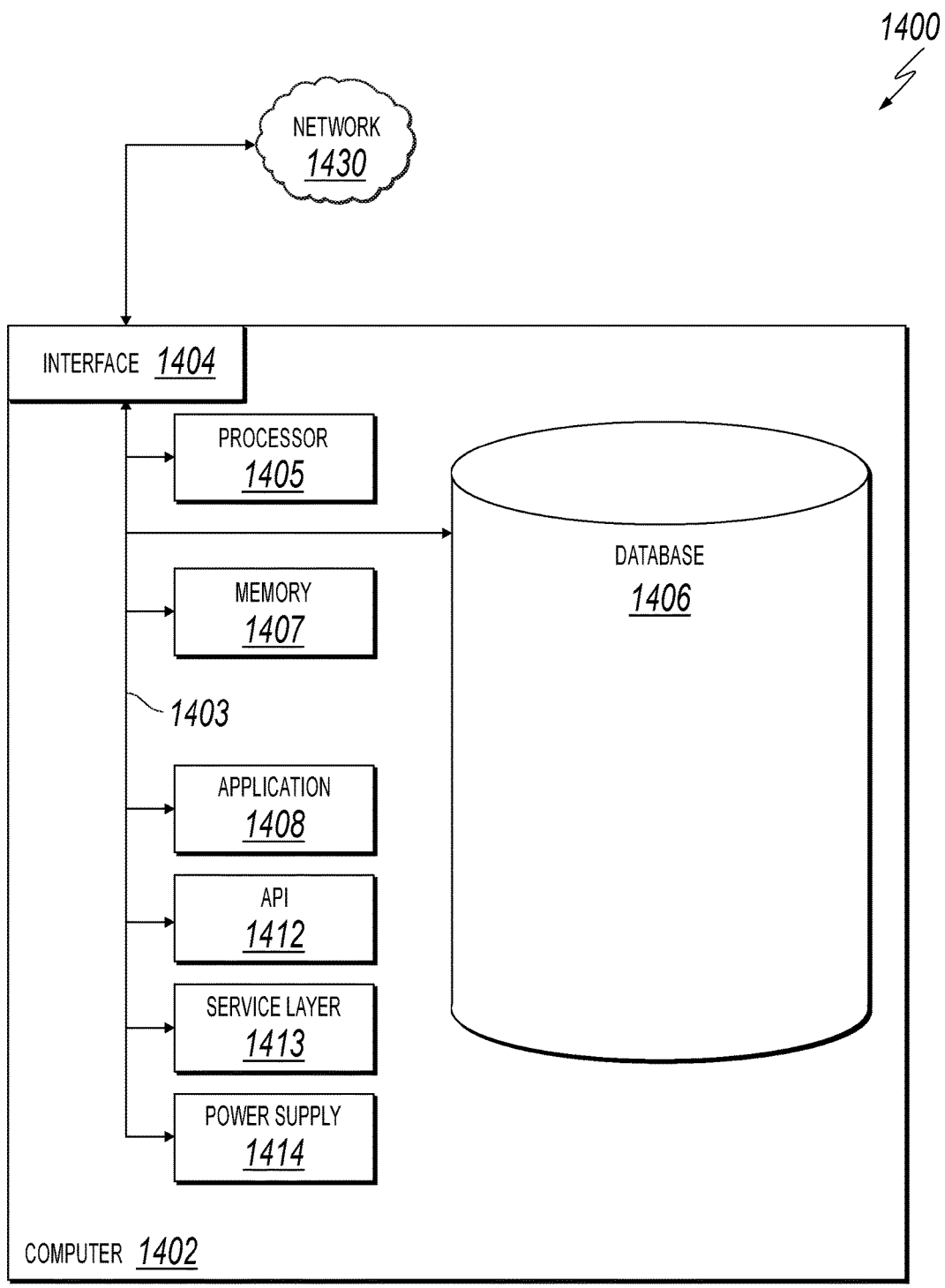
FIG. 14 is a block diagram illustrating an example computer system used to provide computational functionalities associated with described algorithms, methods, functions, processes, flows, and procedures as described in the instant disclosure, according to an implementation of the present disclosure.

FIG. 14 is a block diagram of an example computer system 1400 used to provide computational functionalities associated with described algorithms, methods, functions, processes, flows, and procedures, as described in the instant disclosure, according to an implementation of the present disclosure. The illustrated computer 1402 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 1402 can comprise a computer that includes an input device, such as a keypad, keyboard, touch screen, or other device that can accept user information, and an output device that conveys information associated with the operation of the computer 1402, including digital data, visual, or audio information (or a combination of information), or a graphical-type user interface (UI) (or GUI).

The computer 1402 can serve in a role as a client, network component, a server, a database or other persistency, or any other component (or a combination of roles) of a computer system for performing the subject matter described in the instant disclosure. The illustrated computer 1402 is communicably coupled with a network 1430. In some implementations, one or more components of the computer 1402 can be configured to operate within environments, including cloud-computing-based, local, global, or other environment (or a combination of environments).

At a high level, the computer 1402 is an electronic computing device operable to receive, transmit, process, store, or manage data and information associated with the described subject matter. According to some implementations, the computer 1402 can also include or be communicably coupled with an application server, e-mail server, web server, caching server, streaming data server, or other server (or a combination of servers).

The computer 1402 can receive requests over network 1430 from a client application (for example, executing on another computer 1402) and respond to the received requests by processing the received requests using an appropriate software application(s). In addition, requests can also be sent to the computer 1402 from internal users (for example, from a command console or by other appropriate access method), external or third-parties, other automated applications, as well as any other appropriate entities, individuals, systems, or computers.

Each of the components of the computer 1402 can communicate using a system bus 1403. In some implementations, any or all of the components of the computer 1402, hardware or software (or a combination of both hardware and software), can interface with each other or the interface 1404 (or a combination of both), over the system bus 1403 using an application programming interface (API) 1412 or a service layer 1413 (or a combination of the API 1412 and service layer 1413). The API 1412 can include specifications for routines, data structures, and object classes. The API 1412 can be either computer-language independent or dependent and refer to a complete interface, a single function, or even a set of APIs. The service layer 1413 provides software services to the computer 1402 or other components (whether or not illustrated) that are communicably coupled to the computer 1402. The functionality of the computer 1402 can be accessible for all service consumers using this service layer. Software services, such as those provided by the service layer 1413, provide reusable, defined functionalities through a defined interface. For example, the interface can be software written in JAVA, C++, or other suitable language providing data in extensible markup language (XML) format or other suitable format. While illustrated as an integrated component of the computer 1402, alternative implementations can illustrate the API 1412 or the service layer 1413 as stand-alone components in relation to other components of the computer 1402 or other components (whether or not illustrated) that are communicably coupled to the computer 1402. Moreover, any or all parts of the API 1412 or the service layer 1413 can be implemented as child or sub-modules of another software module, enterprise application, or hardware module without departing from the scope of this disclosure.

The computer 1402 includes an interface 1404. Although illustrated as a single interface 1404 in FIG. 14, two or more interfaces 1404 can be used according to particular needs, desires, or particular implementations of the computer 1402. The interface 1404 is used by the computer 1402 for communicating with other systems that are connected to the network 1430 (whether illustrated or not) in a distributed environment. Generally, the interface 1404 comprises logic encoded in software or hardware (or a combination of software and hardware) and is operable to communicate with the network 1430. More specifically, the interface 1404 can comprise software supporting one or more communication protocols associated with communications such that the network 1430 or interface's hardware is operable to communicate physical signals within and outside of the illustrated computer 1402.

The computer 1402 includes a processor 1405. Although illustrated as a single processor 1405 in FIG. 14, two or more processors can be used according to particular needs, desires, or particular implementations of the computer 1402. Generally, the processor 1405 executes instructions and manipulates data to perform the operations of the computer 1402 and any algorithms, methods, functions, processes, flows, and procedures as described in the instant disclosure.

The computer 1402 also includes a database 1406 that can hold data for the computer 1402 or other components (or a combination of both) that can be connected to the network 1430 (whether illustrated or not). For example, database 1406 can be an in-memory, conventional, or other type of database storing data consistent with this disclosure. In some implementations, database 1406 can be a combination of two or more different database types (for example, a hybrid in-memory and conventional database) according to particular needs, desires, or particular implementations of the computer 1402 and the described functionality. Although illustrated as a single database 1406 in FIG. 14, two or more databases (of the same or combination of types) can be used according to particular needs, desires, or particular implementations of the computer 1402 and the described functionality. While database 1406 is illustrated as an integral component of the computer 1402, in alternative implementations, database 1406 can be external to the computer 1402.

The computer 1402 also includes a memory 1407 that can hold data for the computer 1402 or other components (or a combination of both) that can be connected to the network 1430 (whether illustrated or not). Memory 1407 can store any data consistent with this disclosure. In some implementations, memory 1407 can be a combination of two or more different types of memory (for example, a combination of semiconductor and magnetic storage) according to particular needs, desires, or particular implementations of the computer 1402 and the described functionality. Although illustrated as a single memory 1407 in FIG. 14, two or more memories 1407 (of the same or combination of types) can be used according to particular needs, desires, or particular implementations of the computer 1402 and the described functionality. While memory 1407 is illustrated as an integral component of the computer 1402, in alternative implementations, memory 1407 can be external to the computer 1402.

The application 1408 is an algorithmic software engine providing functionality according to particular needs, desires, or particular implementations of the computer 1402, particularly with respect to functionality described in this disclosure. For example, application 1408 can serve as one or more components, modules, or applications. Further, although illustrated as a single application 1408, the application 1408 can be implemented as multiple applications 1408 on the computer 1402. In addition, although illustrated as integral to the computer 1402, in alternative implementations, the application 1408 can be external to the computer 1402.

The computer 1402 can also include a power supply 1414. The power supply 1414 can include a rechargeable or non-rechargeable battery that can be configured to be either user- or non-user-replaceable. In some implementations, the power supply 1414 can include power-conversion or management circuits (including recharging, standby, or other power management functionality). In some implementations, the power-supply 1414 can include a power plug to allow the computer 1402 to be plugged into a wall socket or other power source to, for example, power the computer 1402 or recharge a rechargeable battery.

There can be any number of computers 1402 associated with, or external to, a computer system containing computer 1402, each computer 1402 communicating over network 1430. Further, the term "client," "user," and other appropriate terminology can be used interchangeably, as appropriate, without departing from the scope of this disclosure. Moreover, this disclosure contemplates that many users can use one computer 1402, or that one user can use multiple computers 1402.

Described implementations of the subject matter can include one or more features, alone or in combination.

For example, in a first implementation, a computer-implemented method, comprises, obtaining a first image of an object oriented in a first direction and a second image of the object oriented in a second direction; determining a plurality of feature points of the object in the first image; determining a plurality of matching feature points of the object in the second image that correspond to the plurality of feature points of the object in the first image; calculating similarity values between the plurality of feature points and the corresponding plurality of matching feature points; calculating depth values of the plurality of feature points; calculating weighted depth values based on the similarity values and depth values; and performing 3D modeling of the object based on the weighted depth values.

The foregoing and other described implementations can each, optionally, include one or more of the following features:

A first feature, combinable with any of the following features, comprises determining a plurality of initial feature points of the object in the first image; and matching the first image with a first grid that includes a plurality of grid cells, wherein determining a plurality of feature points of the object in the first image further comprises filtering the plurality of initial feature points until the number of feature points is the same in each grid cell, and wherein each grid cell includes at least one initial feature point.

A second feature, combinable with any of the previous or following features, wherein determining a plurality of feature points of the object in the first image further comprises, calculating distances from the plurality of initial feature points to center points of the grid cells the plurality of initial feature points are located; and determining, for each grid cell that includes at least one initial feature point, an initial feature point that is closest to the center of the grid cell as the feature point.

A third feature, combinable with any of the previous or following features, wherein determining a plurality of feature points of the object in the first image further comprising determining a center point of a grid cell as a feature point of the grid cell if the grid cell does not include an initial feature point.

A fourth feature, combinable with any of the previous or following features, comprises, determining, a plurality of pre-matching feature points in the second image that correspond to the plurality of feature points based on direction information of the object in the first image and the object in the second image; and matching the second image with a second grid; and wherein determining a plurality of matching feature points of the object in the second image further comprises determining center points of grid cells of the second grid that include at least one pre-matching feature point as the plurality of matching feature points in the second image.

A fifth feature, combinable with any of the previous or following features, wherein determining the similarity values between the plurality of feature points and the corresponding plurality of matching feature points further comprises, determining color values of all pixels within the grid cells of the first grid that include at least one feature point; determining color values of all pixels within the grid cells of the second grid that include at least one matching feature point; calculating average color value differences between all the pixels within the grid cells of the first grid that include at least one feature point and all the pixels within the grid cells of the second grid that include at least one matching feature point; and determining the similarity values of the plurality of feature points and the corresponding plurality of matching feature points based on the average color value differences.

A sixth feature, combinable with any of the previous or following features, wherein a weighted depth value of a feature point is calculated as: weighted depth value=depth value× (sum of the average color value differences of the plurality of feature points except the feature point subject to the weighted depth value calculation/sum of the average color value differences of the plurality of feature points).

A seventh feature, combinable with any of the previous or following features, wherein the area of the grid cells of the second grid are smaller than the area of the grid cells of the first grid.

An eighth feature, combinable with any of the previous or following features, comprises filtering the plurality of feature points based on the similarity values before calculating the weighted depth values.

A ninth feature, combinable with any of the previous or following features, wherein filtering the plurality of feature points further comprises, determining a feature point eliminating threshold based on the similarity values; and eliminating a feature point when its corresponding similarity value is less than the feature point eliminating threshold.

A tenth feature, combinable with any of the previous or following features, wherein the grid cells of the first grid have triangular shape.

In a second implementation, a non-transitory, computer-readable medium storing one or more instructions executable by a computer system to perform operations comprises, obtaining a first image of an object oriented in a first direction and a second image of the object oriented in a second direction; determining a plurality of feature points of the object in the first image; determining a plurality of matching feature points of the object in the second image that correspond to the plurality of feature points of the object in the first image; calculating similarity values between the plurality of feature points and the corresponding plurality of matching feature points; calculating depth values of the plurality of feature points; calculating weighted depth values based on the similarity values and depth values; and performing 3D modeling of the object based on the weighted depth values.

The foregoing and other described implementations can each, optionally, include one or more of the following features:

A first feature, combinable with any of the following features, comprises determining a plurality of initial feature points of the object in the first image; and matching the first image with a first grid that includes a plurality of grid cells, wherein determining a plurality of feature points of the object in the first image further comprises filtering the plurality of initial feature points until the number of feature points is the same in each grid cell, and wherein each grid cell includes at least one initial feature point.

A second feature, combinable with any of the previous or following features, wherein determining a plurality of feature points of the object in the first image further comprises, calculating distances from the plurality of initial feature points to center points of the grid cells the plurality of initial feature points are located; and determining, for each grid cell that includes at least one initial feature point, an initial feature point that is closest to the center of the grid cell as the feature point.

A third feature, combinable with any of the previous or following features, wherein determining a plurality of feature points of the object in the first image further comprising determining a center point of a grid cell as a feature point of the grid cell if the grid cell does not include an initial feature point.

A fourth feature, combinable with any of the previous or following features, comprises, determining, a plurality of pre-matching feature points in the second image that correspond to the plurality of feature points based on direction information of the object in the first image and the object in the second image; and matching the second image with a second grid; and wherein determining a plurality of matching feature points of the object in the second image further comprises determining center points of grid cells of the second grid that include at least one pre-matching feature point as the plurality of matching feature points in the second image.

In a third implementation, a computer-implemented system, comprises one or more computers; and one or more computer memory devices interoperably coupled with the one or more computers and having tangible, non-transitory, machine-readable media storing instructions that, when executed by the one or more computers, perform operations comprises obtaining a first image of an object oriented in a first direction and a second image of the object oriented in a second direction; determining a plurality of feature points of the object in the first image; determining a plurality of matching feature points of the object in the second image that correspond to the plurality of feature points of the object in the first image; calculating similarity values between the plurality of feature points and the corresponding plurality of matching feature points; calculating depth values of the plurality of feature points; calculating weighted depth values based on the similarity values and depth values; and performing 3D modeling of the object based on the weighted depth values.

The foregoing and other described implementations can each, optionally, include one or more of the following features:

A first feature, combinable with any of the following features, comprises determining a plurality of initial feature points of the object in the first image; and matching the first image with a first grid that includes a plurality of grid cells, wherein determining a plurality of feature points of the object in the first image further comprises filtering the plurality of initial feature points until the number of feature points is the same in each grid cell, and wherein each grid cell includes at least one initial feature point.

A second feature, combinable with any of the previous or following features, wherein determining a plurality of feature points of the object in the first image further comprises, calculating distances from the plurality of initial feature points to center points of the grid cells the plurality of initial feature points are located; and determining, for each grid cell that includes at least one initial feature point, an initial feature point that is closest to the center of the grid cell as the feature point.

A third feature, combinable with any of the previous or following features, wherein determining a plurality of feature points of the object in the first image further comprising determining a center point of a grid cell as a feature point of the grid cell if the grid cell does not include an initial feature point.

A fourth feature, combinable with any of the previous or following features, comprises, determining, a plurality of pre-matching feature points in the second image that correspond to the plurality of feature points based on direction information of the object in the first image and the object in the second image; and matching the second image with a second grid; and wherein determining a plurality of matching feature points of the object in the second image further comprises determining center points of grid cells of the second grid that include at least one pre-matching feature point as the plurality of matching feature points in the second image.

A fifth feature, combinable with any of the previous or following features, wherein determining the similarity values between the plurality of feature points and the corresponding plurality of matching feature points further comprises, determining color values of all pixels within the grid cells of the first grid that include at least one feature point; determining color values of all pixels within the grid cells of the second grid that include at least one matching feature point; calculating average color value differences between all the pixels within the grid cells of the first grid that include at least one feature point and all the pixels within the grid cells of the second grid that include at least one matching feature point; and determining the similarity values of the plurality of feature points and the corresponding plurality of matching feature points based on the average color value differences.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus", "computer", or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which can also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures are shown as individual modules that implement the various features and functionality through various objects, methods, or other processes, the programs can instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/–R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory can include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with this disclosure), all or a portion of the Internet, or any other communication system or systems at one or more locations (or a combination of communication networks). The network can communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   obtaining a first image of an object, the object being oriented in a first orientation direction;
   obtaining a second image of the object, the second image of the object comprising the object having moved to a second orientation direction in one or more of elevation angle, deflection angle, and rotation angle, the second orientation direction being different from the first orientation direction;
   determining a plurality of initial feature points of the object in the first image;
   matching the first image with a first grid that includes a plurality of grid cells,
   determining whether one or more of the plurality of grid cells do not include one of the plurality of initial feature points;
   based upon determining that the one or more of the plurality of grid cells do not include the one of the plurality of initial feature points, determining a center point of the one or more of the plurality of grid cells;
   assigning the center point of the one or more of the plurality of grid cells as one of the plurality of initial feature points;
   filtering the plurality of initial feature points until a number of the initial feature points is the same in each of the plurality of grid cells, each of the plurality of grid cells includes at least one of the plurality of initial feature points;
   determining a plurality of matching feature points of the object in the second image that correspond to the plurality of initial feature points of the object in the first image;

calculating similarity values between the plurality of initial feature points and the corresponding plurality of matching feature points;

calculating depth values of the plurality of initial feature points;

calculating weighted depth values of the plurality of initial feature points based on the similarity values and depth values, each of the weighted depth values for each of the plurality of initial feature points is calculated as:

weighted depth value=depth value x (sum of the average color value differences of the plurality of initial feature points except the initial feature point subject to the weighted depth value calculation/sum of the average color value differences of the plurality of initial feature points); and performing, by a model generation module, 3D modeling of the object based on the calculated weighted depth values.

2. The computer-implemented method of claim 1 wherein determining a plurality of initial feature points of the object in the first image further comprising:

calculating distances from the plurality of initial feature points to the center points of the plurality of grid cells where the plurality of initial feature points are located; and determining, for each of the plurality of grid cells that includes at least one of the plurality of initial feature points, an initial feature point that is closest to the center of the grid cell as the feature point.

3. The computer-implemented method of claim 2, further comprising:

determining a plurality of pre-matching feature points in the second image that correspond to the plurality of initial feature points based on direction orientation information of the object in the first image and direction orientation information of the object in the second image; and matching the second image with a second grid;

wherein determining a plurality of matching feature points of the object in the second image further comprises determining center points of grid cells of the second grid that include at least one pre-matching feature point as the plurality of matching feature points in the second image.

4. The computer-implemented method of claim 3, wherein determining the similarity values between the plurality of initial feature points and the corresponding plurality of matching feature points further comprises:

determining color values of all pixels within the plurality of grid cells of the first grid that include at least one of the plurality of feature points;

determining color values of all pixels within the grid cells of the second grid that include at least one matching feature point;

calculating the average color value differences between all the pixels within the plurality of grid cells of the first grid that include at least one of the initial feature points and all the pixels within the grid cells of the second grid that include at least one matching feature point; and determining the similarity values of the plurality of initial feature points and the corresponding plurality of matching feature points based on the average color value differences.

5. The computer-implemented method of claim 3, wherein the area of the grid cells of the second grid are smaller than the area of the plurality of grid cells of the first grid.

6. The computer-implemented method of claim 1, further comprising:

filtering the plurality of initial feature points based on the similarity values before calculating the weighted depth values.

7. The computer-implemented method of claim 6, wherein filtering the plurality of initial feature points further comprising:

determining an initial feature point eliminating threshold based on the similarity values; and eliminating an initial feature point when its corresponding similarity value is less than the initial feature point eliminating threshold.

8. The computer-implemented method of claim 1, wherein the plurality of grid cells of the first grid have triangular shape.

9. A non-transitory, computer-readable medium storing one or more instructions executable by a computer system to perform operations comprising:

obtaining a first image of an object, the object being oriented in a first orientation direction;

obtaining a second image of the object, the second image of the object comprising the object having moved to a second orientation direction in one or more of elevation angle, deflection angle, and rotation angle, the second orientation direction being different from the first orientation direction;

determining a plurality of initial feature points of the object in the first image;

matching the first image with a first grid that includes a plurality of grid cells, determining whether one or more of the plurality of grid cells do not include one of the plurality of initial feature points;

based upon determining that the one or more of the plurality of grid cells do not include the one of the plurality of initial feature points, determining a center point of the one or more of the plurality of grid cells;

assigning the center point of the one or more of the plurality of grid cells as one of the plurality of initial feature points;

filtering the plurality of initial feature points until a number of the initial feature points is the same in each of the plurality of grid cells, each of the plurality of grid cells includes at least one of the plurality of initial feature points;

determining a plurality of matching feature points of the object in the second image that correspond to the plurality of initial feature points of the object in the first image;

calculating similarity values between the plurality of initial feature points and the corresponding plurality of matching feature points;

calculating depth values of the plurality of initial feature points;

calculating weighted depth values of the plurality of initial feature points based on the similarity values and depth values, each of the weighted depth values for each of the plurality of initial feature points is calculated as:

weighted depth value=depth value x (sum of the average color value differences of the plurality of initial feature points except the initial feature point subject to the weighted depth value calculation/sum of the average color value differences of the plurality of initial feature points); and performing, by a model generation module, 3D modeling of the object based on the calculated weighted depth values.

10. The non-transitory, computer-readable medium of claim 9, wherein determining a plurality of initial feature points of the object in the first image further comprising:
   calculating distances from the plurality of initial feature points to the center points of the plurality of grid cells where the plurality of initial feature points are located; and
   determining, for each of the plurality of grid cells that includes at least one of the plurality of initial feature points, an initial feature point that is closest to the center of the grid cell as the feature point.

11. The non-transitory, computer-readable medium of claim 10, further comprising:
   determining a plurality of pre-matching feature points in the second image that correspond to the plurality of initial feature points based on direction orientation information of the object in the first image and direction orientation information of the object in the second image; and
   matching the second image with a second grid, wherein determining a plurality of matching feature points of the object in the second image further comprises determining center points of grid cells of the second grid that include at least one pre-matching feature point as the plurality of matching feature points in the second image.

12. The non-transitory, computer-readable medium of claim 9, wherein the area of the grid cells of the second grid are smaller than the area of the plurality of grid cells of the first grid.

13. The non-transitory, computer-readable medium of claim 9, further comprising:
   filtering the plurality of initial feature points based on the similarity values before calculating the weighted depth values.

14. The non-transitory, computer-readable medium of claim 13, wherein filtering the plurality of initial feature points further comprising:
   determining an initial feature point eliminating threshold based on the similarity values; and
   eliminating an initial feature point when its corresponding similarity value is less than the initial feature point eliminating threshold.

15. A computer-implemented system, comprising:
   one or more computers; and
   one or more computer memory devices interoperably coupled with the one or more computers and having tangible, non-transitory, machine-readable media storing instructions that, when executed by the one or more computers, perform operations comprising:
   obtaining a first image of an object, the object being oriented in a first orientation direction;
   obtaining a second image of the object, the second image of the object comprising the object having moved to a second orientation direction in one or more of elevation angle, deflection angle, and rotation angle, the second orientation direction being different from the first orientation direction;
   determining a plurality of initial feature points of the object in the first image;
   matching the first image with a first grid that includes a plurality of grid cells,
   determining whether one or more of the plurality of grid cells do not include one of the plurality of initial feature points;
   based upon determining that the one or more of the plurality of grid cells do not include the one of the plurality of initial feature points, determining a center point of the one or more of the plurality of grid cells;
   assigning the center point of the one or more of the plurality of grid cells as one of the plurality of initial feature points;
   filtering the plurality of initial feature points until a number of the initial feature points is the same in each of the plurality of grid cells, each of the plurality of grid cells includes at least one of the plurality of initial feature points;
   determining a plurality of matching feature points of the object in the second image that correspond to the plurality of initial feature points of the object in the first image;
   calculating similarity values between the plurality of initial feature points and the corresponding plurality of matching feature points;
   calculating depth values of the plurality of initial feature points;
   calculating weighted depth values of the plurality of initial feature points based on the similarity values and depth values, each of the weighted depth values for each of the plurality of initial feature points is calculated as:
      weighted depth value=depth value x (sum of the average color value differences of the plurality of initial feature points except the initial feature point subject to the weighted depth value calculation/sum of the average color value differences of the plurality of initial feature points); and
   performing 3D modeling of the object based on the calculated weighted depth values.

16. The computer-implemented system of claim 15, wherein determining a plurality of initial feature points of the object in the first image further comprising:
   calculating distances from the plurality of initial feature points to the center points of the plurality of grid cells where the plurality of initial feature points are located; and
   determining, for each of the plurality of grid cells that includes at least one of the plurality of initial feature points, an initial feature point that is closest to the center of the grid cell as the feature point.

17. The computer-implemented system of claim 16, further comprising:
   determining a plurality of pre-matching feature points in the second image that correspond to the plurality of initial feature points based on direction orientation information of the object in the first image and direction orientation information of the object in the second image; and
   matching the second image with a second grid,
   wherein determining a plurality of matching feature points of the object in the second image further comprises determining center points of grid cells of the second grid that include at least one pre-matching feature point as the plurality of matching feature points in the second image.

18. The computer-implemented system of claim 17, wherein determining the similarity values between the plurality of initial feature points and the corresponding plurality of matching feature points further comprises:

determining color values of all pixels within the plurality of grid cells of the first grid that include at least one of the plurality of feature points;

determining color values of all pixels within the grid cells of the second grid that include at least one matching feature point;

calculating the average color value differences between all the pixels within the plurality of grid cells of the first grid that include at least one of the initial feature points and all the pixels within the grid cells of the second grid that include at least one matching feature point; and determining the similarity values of the plurality of initial feature points and the corresponding plurality of matching feature points based on the average color value differences.

19. The computer-implemented system of claim 15, wherein the area of the grid cells of the second grid are smaller than the area of the plurality of grid cells of the first grid.

20. The computer-implemented system of claim 15, further comprising, before calculating the weighted depth values:

determining an initial feature point eliminating threshold based on the similarity values; and eliminating an initial feature point when its corresponding similarity value is less than the initial feature point eliminating threshold.

\* \* \* \* \*